July 17, 1962     H. R. FLETCHER     3,044,525
INFLATABLE ARTICLES AND INFLATION VALVES THEREFOR
Filed May 25, 1960
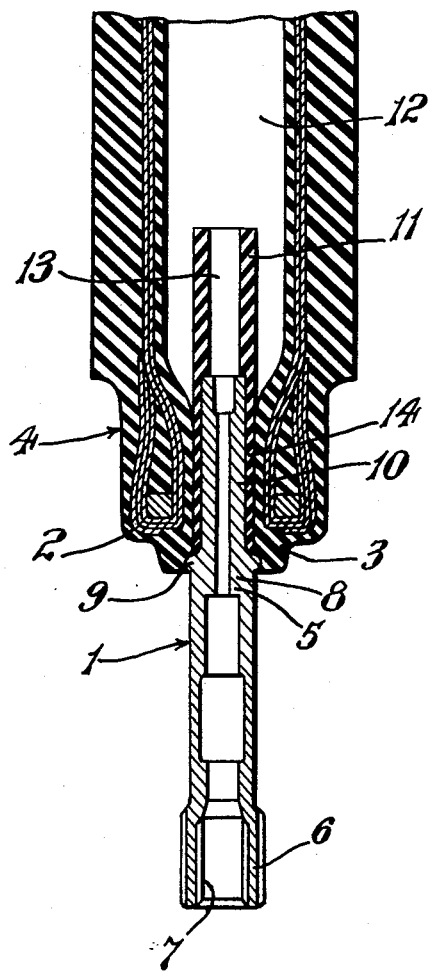
INVENTOR
Henry Raymond Fletcher
by Benj. T. Rauber
his attorney

United States Patent Office 3,044,525
Patented July 17, 1962

3,044,525
INFLATABLE ARTICLES AND INFLATION VALVES THEREFOR
Henry Raymond Fletcher, Birmingham, England, assignor to Dunlop Rubber Company Limited, a British company
Filed May 25, 1960, Ser. No. 31,685
Claims priority, application Great Britain May 27, 1959
5 Claims. (Cl. 152—429)

This invention relates to inflatable articles and inflation valves therefor.

In the manufacture of pneumatic tyres as described in co-pending patent application of Wright et al. Ser. No. 855,083 filed Nov. 24, 1959, comprising a tubeless pneumatic tyre of axially flattened shape, an inflation valve is moulded and cured in a position between the bead portions of the tyre. The valve performs a dual function, it being required not only to inflate the tyre in the mould prior to moulding and curing but to inflate the tyre during subsequent use. During the moulding and curing operation, there is a tendency for rubber in the bead region of the tyre adjacent to the inflation valve to flow into the outlet end of the valve so as to obstruct or prevent subsequent deflation after cure and inflation and deflation during use.

According to the invention an inflation valve comprises a tubular body portion having an inlet end and an outlet end and a flexible tubular extension at the outlet end.

The invention also includes an inflatable article, e.g., a pneumatic tyre having attached thereto an inflation valve according to the invention, the flexible tubular extension projecting into the inflationary chamber.

The invention also provides a method of moulding an inflatable article comprising attaching an inflation valve according to the invention to the article, the flexible tubular extension projecting into an inflationary chamber of the article, locating the article and the valve in a mould, heating the mould, and inflating the article via the inflation valve.

One embodiment of the invention will now be described by way of example, with reference to the accompanying drawing, which is an axial cross-sectional view of part of a pneumatic tyre incorporating an inflation valve according to the invention.

The inflation valve 1 shown moulded between the beads 2 and 3 of a tyre 4 of the kind described in said application Ser. No. 855,083 comprises a tubular body portion 5 of brass having an inlet end 6, having an internally screw-threaded portion 7 for insertion of a conventional non-return valve mechanism, and an outlet end 8. The outlet end 8 has a flange 9 and a reduced-diameter portion 10 for moulding between the beads 2 and 3 of the tyre 1.

A length 11 of flexible vulcanised rubber tubing is moulded around the reduced-diameter portion 10 to extend axially beyond the portion 10, the rubber tubing 11 projecting freely into the inflationary chamber 12 of the tyre 14. An inflation passage 13 is thus formed to enable inflationary air to pass through the valve 1 into the tyre 4.

The valve 1 is made by inserting the body portion 5 into a mould, the rubber tubing 11 being formed around the reduced-diameter portion 10 by transfer moulding. The rubber tubing 11 is thus firmly bonded to the portion 10.

The valve 1 is then removed from the mould, and the outer surface of the portion 14 of the rubber tubing 11 is roughened and coated with rubber solution.

The tyre 4, with the inflation valve 1 positioned between its beads as shown in the drawing is then located within a heated tyre vulcanising mould, the mould closed, and the tyre inflated through the inflation valve.

The rubber of the tyre, adjacent to the valve 1, may flow during moulding and curing but will not obstruct or block the inflation valve since the rubber tubing 11 attached to the valve body 5 maintains the end of the inflation passage 13 in a position clear of the flowing rubber. Moreover, when the tyre is in use, deflection of the tyre onto the projecting tubing will cause no damage to the tyre or the tubing on account of its flexible nature.

A further advantage of the construction described above is that a substantial thickness of prevulcanised rubber 14 is provided around the valve body 5 in the region of the tyre beads. During moulding of the tyre the rubber between the beads tends to be squeezed out in the region surrounding the valve, and the provision of a pre-vulcanised rubber covering on the valve ensures that an adequate thickness of rubber surrounds the valve after moulding.

While the flexible tubular extension has been described as being constituted by a length of flexible rubber tubing bonded to the valve body, the extension can alternatively be mounted separately from the valve body and detachably secured thereto, for example, by stretching the tubing to fit over the outlet end of the valve body, said end being in this instance, provided with a crowned external cylindrical surface.

Having now described my invention, what I claim is:

1. A method of moulding an inflatable article comprising a chamber for inflating fluid and an inflation valve comprising a tubular body portion having an inlet end through which inflating fluid is supplied and an outlet end delivering into said chamber and having a flexible tubular extension on the outlet end to project into said chamber which comprises attaching the valve to the article with the flexible tubular body portion extending into the inflationary chamber of the article so that the outlet of the valve is disposed at a position removed from the inner peripheral surface of the article locating the assembly of the article and the valve in a mould, heating the mould to render the material of the article plastic and inflating the article through the valve to unite said valve to said article.

2. A method of moulding a rigid inlet tube in a pneumatic tyre of vulcanizable elastomeric composition having a pair of closely spaced beads and side walls extending radially outwardly therefrom in closely spaced, substantially parallel, position, which comprises enclosing an end portion of the rigid inlet tube in a flexible tube extending beyond the end of the rigid tube, placing said rigid tube and flexible tube assembly in an opening in the tyre of unvulcanized elastomer between said beads with the end of said rigid tube terminating at the inner periphery of the space between said side walls and with the flexible tube extending into said space, and vulcanizing said tyre about the portion of said flexible tube enclosing said rigid tube.

3. The method of claim 2 in which said tube is composed of vulcanized rubber composition.

4. A pneumatic tyre of elastomeric material having a pair of closely spaced beads and side walls extending radially outwardly from said beads in closely spaced position, said tyre being closed between said beads, a rigid, open ended inlet tube extending into the tyre between said beads and terminating at the inner periphery of the space between said side walls and a flexible tube fluid tightly enclosing the portion of said rigid tube in said tyre and extending beyond the end of said rigid tube into the space between said side walls, said flexible tube being vulcanized to the elastomer of said tyre between said beads.

5. The pneumatic tyre of claim 4 in which said flexible tube is of a vulcanized rubber composition.

References Cited in the file of this patent
UNITED STATES PATENTS

| | | |
|---|---|---|
| 1,694,872 | Van Rennes | Dec. 11, 1928 |
| 2,090,210 | Lee | Aug. 17, 1937 |
| 2,230,879 | Bronson | Feb. 4, 1941 |
| 2,339,542 | Hale | Jan. 18, 1944 |